US009783690B2

(12) United States Patent
Markies et al.

(10) Patent No.: US 9,783,690 B2
(45) Date of Patent: Oct. 10, 2017

(54) INK COMPOSITION, A METHOD FOR PREPARING THE INK COMPOSITION AND USE THEREOF, A WATER SOLUBLE RESIN AND USE THEREOF IN AN INK COMPOSITION

(71) Applicant: OCE-TECHNOLOGIES B.V., Venlo (NL)

(72) Inventors: Peter R. Markies, Grubbenvorst (NL); Jozef P. Moonen, Venlo (NL); Frederik L. E. M. Suilen, Swalmen (NL); Ronald Groothuijse, Sevenum (NL); Richard Van Hameren, Herten (NL); Peter O. Colin, Kaulille (BE); Mark A. M. Leenen, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 494 days.

(21) Appl. No.: 14/529,792

(22) Filed: Oct. 31, 2014

(65) Prior Publication Data

US 2015/0054884 A1    Feb. 26, 2015

Related U.S. Application Data

(63) Continuation of application No. PCT/EP2013/058613, filed on Apr. 25, 2013.

(30) Foreign Application Priority Data

May 9, 2012  (EP) ..................................... 12167335

(51) Int. Cl.
C09D 11/102    (2014.01)
C08G 65/26     (2006.01)
(Continued)

(52) U.S. Cl.
CPC ............ *C09D 11/102* (2013.01); *C08G 69/40* (2013.01); *C09D 11/10* (2013.01); *C09D 11/107* (2013.01); *C09D 11/322* (2013.01)

(58) Field of Classification Search
USPC ........................................................ 524/160
See application file for complete search history.

(56) References Cited

U.S. PATENT DOCUMENTS 5,250,109 A * 10/1993 Chan .................... C09D 11/30
106/31.43
6,475,271 B2 * 11/2002 Lin ........................ C09D 11/30
106/31.27
(Continued)

FOREIGN PATENT DOCUMENTS

EP    1219688 A1    12/2001
EP    1371697 A2    6/2003
(Continued)

OTHER PUBLICATIONS

International Search Report for PCT/EP2013/058613 dated Aug. 26, 2013.
(Continued)

*Primary Examiner* — Vu A Nguyen
(74) *Attorney, Agent, or Firm* — Birch, Stewart, Kolasch & Birch, LLP

(57) ABSTRACT

The invention relates to a latex ink composition, the latex ink composition comprising a water soluble resin. The invention further relates to a water soluble resin suitable for a latex ink composition, the water soluble resin comprising a backbone and a stabilizing group, wherein the stabilizing group is capable of forming hydrogen bonds. The invention further relates to the use of a water soluble resin in a latex ink composition.

7 Claims, 2 Drawing Sheets

(51) Int. Cl.
*C09D 11/10* (2014.01)
*C09D 11/322* (2014.01)
*C08G 69/40* (2006.01)
*C09D 11/107* (2014.01)

(56) References Cited

U.S. PATENT DOCUMENTS

2006/0205840 A1\* 9/2006 Kato .................. C09D 11/30
    523/160
2011/0243851 A1    10/2011    Narayanan et al.

FOREIGN PATENT DOCUMENTS

| | | | | |
|---|---|---|---|---|
| GB | WO 0230913 A1 \* | 4/2002 | ........... | C07D 251/70 |
| JP | 2002-30241 A | 1/2002 | | |
| JP | 2003-20433 A | 1/2003 | | |

OTHER PUBLICATIONS

Written Opinion of the International Searching Authority for PCT/EP2013/058613 dated Aug. 26, 2013.
European Office Action, dated Jul. 27, 2017, for European Application No. 13722712.0.

\* cited by examiner

INK COMPOSITION, A METHOD FOR PREPARING THE INK COMPOSITION AND USE THEREOF, A WATER SOLUBLE RESIN AND USE THEREOF IN AN INK COMPOSITION

CROSS REFERENCE TO RELATED APPLICATIONS

This application is a Continuation of PCT International Application No. PCT/EP2013/058613, filed on Apr. 25, 1013, which claims priority under 35 U.S.C. 119(a) to patent application Ser. No. 12/167,335.4, filed in Europe on May 9, 2012, all of which are hereby expressly incorporated by reference into the present application.

The invention relates to an ink composition. The present invention further relates to a method for preparing the ink composition and to use of the ink composition. The present invention also relates to a water soluble resin, to a method for preparing the water soluble resin and to use of the water soluble resin in an ink composition.

BACKGROUND OF THE INVENTION

Ink compositions comprising water and a water dispersible resin are known in the art. These ink compositions are also known as latex ink compositions. Droplets of these inks may be applied onto a receiving medium by jetting droplets of these inks using an inkjet printing apparatus. Generally, latex inks further comprise a colorant, such as a pigment in addition to the dispersible resin and water. Water functions as a vehicle for the other components of the ink composition. However, water may evaporate from the latex ink composition. Evaporation of water from the ink may be desired once droplets of the ink have been applied onto a receiving medium to form an image. On the other hand, evaporation of water may be undesired when the ink is still in the print head. For example, evaporation of water may result in precipitation of components of the ink composition, for example precipitation of the resin or the colorant. Precipitation of these solids may result in clogging of the nozzles, thereby decreasing the jetting performance of an inkjet printing apparatus. It is therefore desired to prevent precipitation of solids from the ink composition. It is known that the evaporation of the ink vehicle may be diminished by (partially) exchanging water for a water-soluble co-solvent. These water-soluble co-solvents may have a low volatility, such that the vehicle evaporates slower and the ink composition stays stable for a longer period of time. However, although changing the composition of the ink vehicle may slow down evaporation, the vehicle may still evaporate, resulting in clogging of the nozzle, which may lead to nozzle failure. Once the vehicle is evaporated, the solid particles of the ink composition are not stabilized anymore. Therefore, it may not be possible anymore to re-disperse the solid components of the ink composition after evaporation of the ink vehicle. Thus, precipitation of the solid particles of the ink composition may be irreversible.

Furthermore, the ink vehicle comprising the water-soluble co-solvent has to be removed after printing. Applying co-solvents having low volatility may increase the energy requirements for drying the prints, compared to inks having an essentially aqueous vehicle, and/or may necessitate the use of porous receiving media for absorbing the co-solvents. In addition, evaporation of co-solvents may result in the formation of vapors that are undesired from a health, safety and environmental point of view.

It is therefore an object of the invention to provide a latex ink composition that mitigates the above mentioned problems.

SUMMARY OF THE INVENTION

The object of the invention is achieved in an ink composition comprising:
a) water;
b) a water dispersible resin;
c) a colorant;
d) a water soluble resin, the water soluble resin comprising a backbone and a stabilizing group, the stabilizing group being capable of forming intermolecular hydrogen-bonds.

Water Dispersible Resin

The inkjet ink according to the present invention may contain a water-dispersible resin in view of the colorant fixability to recording media. The water dispersible resin may also be referred to as latex resin. As the water-dispersible resin, a water-dispersible resin excellent in film formability (image formability) and having high water repellency, high waterfastness, and high weatherability is useful in recording images having high waterfastness and high image density (high color developing ability).

Examples of the water-dispersible resin include condensed synthetic resins, addition synthetic resins and natural polymer compounds.

Examples of the synthetic resins include polyester resins, polyurethane resins, polyepoxy resins, polyamide resins, polyether resins, poly(meth)acrylic resins, acryl-silicone resins, fluorine-based resins.

Examples of the addition synthetic resins include polyolefin resins, polystyrene-based resins, polyvinyl alcohol-based resins, polyvinyl ester-based resins, poly(meth)acrylic acid-based resins, styrene-acrylate copolymer resins and unsaturated carboxylic acid-based resins.

Examples of the natural polymer compounds include celluloses, rosins, and natural rubbers.

The water dispersible resin used in the present invention may be made of a resin having a water soluble functional group such as a carboxylic group or a sulfo group. Examples of the water dispersible resin are made of at least one of the following group consisting of: a vinyl acetate resin, a styrene-butadiene resin, a vinyl chloride resin, an acrylic-styrene resin, a butadiene resin, a styrene resin, or it may be a mixture of these resins.

Examples of commercially available water-dispersible resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.), acrylic copolymer emulsions of DSM Neoresins, e.g. the NeoCryl product line, in particular acrylic styrene copolymer emulsions NeoCryl A-662, NeoCryl A-1131, NeoCryl A-2091, NeoCryl A-550, NeoCryl BT-101, NeoCryl SR-270, NeoCryl XK-52, NeoCryl XK-39, NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, Neocryl A-633, NeoCryl BT-24, NeoCryl BT-26, NeoCryl BT-26, NeoCryl XK-15, NeoCryl X-151, NeoCryl XK-232, NeoCryl XK-234, NeoCryl XK-237, NeoCryl XK-238-NeoCryl XK-86, NeoCryl XK-90 and NeoCryl XK-95, acrylic copolymer emulsions of Alberdingk Boley GmbH, styrene-acrylic copolymer emulsions of Alberdingk Boley GmbH or polyester-polyurethane resins, such as Alberdingk® U 6100, U6150, U8001, U9150, U9370, U9380, U9700, U 9800, UC90, UC150, UC300, UC300 VP or UC310 resin obtainable from Alberdingk Boley GmbH. However, the water-dispersible resin emulsion is not limited to these examples.

The water-dispersible resin may be used in the form of a homopolymer, a copolymer or a composite resin, and all of water-dispersible resins having a monophase structure or core-shell structure and those prepared by power-feed emulsion polymerization may be used.

As the water-dispersible resin, it is possible to use a resin itself having a hydrophilic group and self-dispersibility, and a resin itself having no dispersibility but to which the dispersibility is imparted with use of a surfactant and another resin having a hydrophilic group. Among these resins, an emulsion of a resin fine particle obtained by emulsification or suspension polymerization of ionomer of a polyester resin or polyurethane resin is most suitably used. In the case of emulsification of an unsaturated monomer, a resin emulsion is obtained by reacting water into which the unsaturated monomer, a polymerization initiator, a surfactant, a chain transfer agent, a chelating agent and a pH adjustor are added. Thus, a water-dispersible resin can be easily obtained, and desired properties are easily obtained because the resin components can be changed.

As the unsaturated monomer, unsaturated carboxylic acids, monofunctional or polyfunctional (meth)acrylic acid ester monomers, (meth)acrylic acid amide monomers, aromatic vinyl monomers, vinyl cyano compound monomers, vinyl monomers, allyl compound monomers, olefin monomers, diene monomers, and oligomers having unsaturated carbons may be used alone or in combination. By combining these monomers, properties or the resulting resin can be flexibly modified. The properties of the resulting resin can also be modified with use of an oligomer type polymerization initiator, through a polymerization reaction or graft reaction.

Examples of the unsaturated carboxylic acids include acrylic acids, methacrylic acid, itaconic acids, fumaric acids, and maleic acids.

Examples of the monofunctional (meth)acrylic acid ester monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salt, 3-methacryloxypropyl trimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate, and acryloxyethyltrimethoxy ammonium salt.

Examples of the polyfunctional (meth)acrylic acid monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylolpropane trimethacrylate, trimethylolethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane, trimethylolpropane triacrylate, trimethylolethane triacrylate, tetramethylolmethane triacrylate, ditrimethylol tetraacrylate, tetramethylolmethane tetraacrylate, pentaerythritol tetraacrylate, and dipentaerythritol hexaacrylate.

Examples of the (meth)acrylic acid amide monomers include acrylamide, methacrylamide, N,N-dimethyacrylamide, methylene-bis-acrylamide, and 2-acrylamide-2-methylpropane sulfonic acid. Examples of the aromatic vinyl monomers include styrene, methylstyrene, vinyltoluene, 4-t-butylstyrene, chlorostyrene, vinylanisole, vinylnaphthalene, and divinylbenzene.

Examples of the vinyl cyano compound monomers include acrylonitrile, and methacrylonitrile.

Examples of the vinyl monomers include vinyl acetate, vinylidene chloride, vinyl ether, vinyl ketone, vinylpyrrolidone, vinyl sulfonic acid or salts thereof, vinyltrimethoxysilane, and vinyltriethoxysilane.

Examples of the allyl compound monomers include allylsulfonic acid or salts thereof, allylamine, ally chloride, diallylamine, and diallyldimethylammonium salts.

Examples of the olefin monomers include ethylene, and propylene. Examples of the diene monomers include butadiene, and chloroprene.

Examples of the oligomers having unsaturated carbon atoms include styrene oligomers having methacryloyl groups, styrene-acrylonitrile oligomer having methacryloyl groups, methyl methacrylate oligomers having methacryloyl groups, dimethyl siloxane oligomers having methacryloyl groups, and polyester oligomers having acryloyl groups.

The content of the water-dispersible resin added in the ink composition of the present invention may be from 1-40 weight % based on the total weight of the ink, and it may be preferably from 1.5-30 weight %, and it may be more preferably from 2-25 weight %. Even more preferably, the amount of the water-dispersible resin contained in the inkjet ink, as a solid content, may be 2.5 weight % to 15 weight %, and even more preferably 3 weight % to 7 weight %, relative to the total ink composition. Note that the solid content of the inkjet ink can be determined by a method of separating only water dispersible components of the ink composition, such as the water-dispersible resin parts and water-dispersible colorant parts, from the inkjet ink. In addition, when a pigment is used as a water-dispersible colorant, a mass reduction ratio of the resulting inkjet ink is evaluated through a thermal mass analysis, thereby making it possible to measure a mass ratio between the colorant parts and the water-dispersible resin parts. In the case where the colorant is an inorganic pigment contained in heavy metal atoms and molecular skeleton, or a metal-containing organic pigment or metal-containing dye, the solid content parts of the colorant can be determined by the fluorescent X-ray analysis or by TGA.

The average particle diameter (D50) of the water-dispersible resin may be preferably from 10 nm-1 µm, it may be more preferably from 2-500 nm, and it may be still more preferably from 10-200 nm, and especially preferably it may be from 20-200 nm. When the average particle diameter (D50) is less than 2 nm, significant effects in improving the image quality or enhancing transfer characteristics of the image cannot be fully expected, even if aggregation occurs.

The average particle diameter (D50) of the water-dispersible resin may be relevant to the viscosity of the dispersion liquid. In the case of water-dispersible resins having the same composition, the smaller the particle diameter, the higher may be the viscosity at the same solid content.

When the average particle diameter (D50) is greater than 1 µm, there may be a possibility that the ejection characteristics of the ink from the inkjet head or the storage stability of the ink will be deteriorated. In order not to impair the ink ejection stability, the average particle diameter (D50) of the water-dispersible resin may be preferably 200 nm or smaller, and more preferably 150 nm or smaller.

In addition, there are no specific restrictions to the particle size distribution of the polymer particles, and it is possible that the polymer particles have a broad particle size distribution or the polymer particles have a particle size distribution of mono-disperse type.

In an embodiment, two or more water-dispersible resins may be used in combination in the ink.

Colorant

The colorant may provide the ink composition with color. The colorant may be a pigment or a dye. The dye may dissolve in the ink composition and/or the latex resin. Alternatively, the colorant may be a pigment. The pigment may not dissolve in the ink composition. The pigment may be dispersible in the ink composition. Alternatively, a mixture of a dye and a pigment may be used as the colorant.

Examples of the pigment usable in the present invention include those commonly known without any limitation. Examples of the pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or a diketopyrrolopyrrole colorant.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigment, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101 (colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (CA. Pigment Black 7) or metal-based pigments (e.g., copper, iron (CA. Pigment Black 11), and titanium oxide; and organic pigments (e.g., aniline black (CA. Pigment Black 1).

The pigment may be a self dispersible pigment or not. The self dispersible pigment may show water-dispersibility in water in the absence of an additional dispersant. Self dispersibility may be provided to a pigment, e.g. by the presence of at least one hydrophilic group on the surface of the pigment.

Alternatively, the pigment may not be self dispersible. In that case, the pigment may be provided with dispersibility by coating the pigment with a dispersible polymer. For example, the pigment may be coated with an anionic polymer, a cationic polymer or a zwitterionic polymer. Alternatively, or in addition, the pigment may be coated with a polymer comprising acidic or basic groups. In the latter case, the dispersibility may depend on the pH of the ink and may be suitably tuned by tuning the pH of the medium. The dependency of the dispersibility of the pigment in the ink composition may be used e.g. to precipitate the pigment from the ink composition onto the receiving medium after printing, to pin the pigment onto the receiving medium. This may improve the print quality. The pH may be tuned e.g. by tuning the pH of the receiving medium, or by applying a primer solution onto the receiving medium.

Water Soluble Resin

The ink composition according to the present invention may comprise a water soluble resin. The water soluble resin may comprise a backbone. The backbone may be a water soluble backbone. The water soluble backbone may comprise a water soluble polymer chain or a water soluble oligomer chain. Examples of water soluble polymers chains are polyether polymer chains, such as polyethylene glycol (PEG), polypropylene glycol (PPG) or ethylene glycol-propylene glycol copolymers, oligomeric or polymeric pyrrolidone chains, oligomeric or polymeric vinyl pyrrolidone chains, oligomeric or polymeric vinylalcohol chains, oligosaccharide chains or polysaccharide chains. Examples of oligosaccharide chains are oligoglucose chains, oligofructose chains, oligogalactose chains, oligoribose chains and oligoxylose chains. Examples of polysaccharide chains include a starch chain, a cellulose chain, a chitine chain and a pectine chain. Examples of ethylene glycol-propylene glycol copolymers are ethylene glycol-propylene glycol block-copolymers, such as Pluronic® polymers. The water soluble polymer chains may comprise linear chains, branched chains or a mixture thereof. The water soluble resin may further comprise a stabilizing group. The backbone may provide the water soluble resin with water solubility. Furthermore, the backbone may function as a linker and a spacer to link stabilizing groups that may be present within the water soluble resin and to space these stabilizing groups.

The stabilizing group may be capable of forming intermolecular hydrogen-bonds. The stabilizing group may comprise a hydrogen bond acceptor or a hydrogen bond donor, or a combination thereof. For example, the stabilizing group may comprise an amine group, such as a secondary amine group, a hydroxyl functional group, an amide group or an ester group. These groups comprise at least one hydrogen bond donor or hydrogen bond acceptor and may be able to form intermolecular hydrogen bonds.

The stabilizing group may comprise a cyclic group. The presence of a cyclic group provides the stabilizing group with rigidity. Preferably, at least two of the hydrogen bond donors and hydrogen bond acceptors are part of the cyclic group. The rigidity of the cyclic group may keep the hydrogen bond donors and hydrogen bond acceptors in a predetermined position with respect to one another. Consequently, the presence of a cyclic group in the stabilizing group may improve the strength of intermolecular hydrogen bonding. Non-limiting examples of the stabilizing group are a glutamate-group, a 5-pyrrolidonecarboxylate group, a salicylate group, an amino-acid group, a sorbitol group, a monosaccharide group, such as a glucose group, a fructose group, a xylose group, a galactose group, a ribose group and a deoxyribose group, or a disaccharide group, such as a sucrose group, a maltose group and a lactose group. The water soluble resin may further comprise a bridging group. The bridging group may connect the backbone of the water soluble resin to the stabilizing group.

In an embodiment, the water soluble resin comprises a water-soluble backbone, wherein the backbone consists essentially of a polyethyleneglycol chain, a polypropyleneglycol chain, a polyethylene-propylene glycol chain, a polypyrrolidone chain, a polyvinylpyrrolidone chain, a polyvinylalcohol chain or a polysaccharide chain; and wherein the water soluble resin further comprises a stabilizing group capable of forming intermolecular hydrogen-bonds, the stabilizing group comprising a 2-pyrrolidone moiety, a salicylic acid moiety, a glutamate moiety, a 5-pyrrolidonecarboxylate moiety, a monosaccharide moiety or a disaccharide moiety.

The water soluble backbone and the stabilizing group may be selected independently. Preferably, the stabilizing group and the backbone are distinct, i.e. the stabilizing group is not the same as the backbone or a unit of the backbone. For example, if the stabilizing group comprises a glucose group, then the backbone does not comprise a glucose moiety.

In an embodiment, the water soluble resin comprises a water-soluble backbone, wherein the backbone consists essentially of a polyethyleneglycol chain, a polypropyleneglycol chain, a polyethylene-propylene glycol chain, a polypyrrolidone chain, a polyvinylpyrrolidone chain or a polyvinylalcohol chain; and wherein the water soluble resin further comprises a stabilizing group capable of forming intermolecular hydrogen-bonds, the stabilizing group comprising a 2-pyrrolidone moiety, a salicylic acid moiety, a glutamate moiety or a 5-pyrrolidonecarboxylate moiety.

In a further embodiment, the water soluble backbone consists essentially of a polyethyleneglycol chain, a polypropyleneglycol chain or a polyethyleneglycol-propyleneglycol chain, the water soluble resin further comprising a stabilizing group, the stabilizing group comprising a 2-pyrrolidone moiety or a salicylic acid moiety.

The water soluble resin may be able to form hydrogen bridges with water. However, when water evaporates from the ink, no more water may be available to form hydrogen bridges. Alternatively, the stabilizing groups may form intermolecular hydrogen bonds between stabilizing groups, and thereby a network of soluble resin molecules may be formed. Other component of the ink composition, such as a pigment particle or a particle of a dispersible resin, may be incorporated in the network of the soluble resin molecules. Without wanting to be bound to any theory, it is believed that the steric bulk, provided by the water soluble resin may prevent or at least mitigate the irreversible coagulation of colorant and/or polymer dispersible resin particles. The water soluble resin may form a matrix upon evaporation of water. The colorant particles and/or the water dispersible resin particles may be stabilized in the matrix provided by the water soluble resin. The matrix of the soluble resin molecules, comprising the particles of pigment and dispersible resin, may form a solid film. Therefore, by incorporating the ink components, such as the pigment particle or the particle of the dispersible resin in the network of the soluble resin molecules, these particles may be stabilized by the network of the soluble resin molecules in the solid film. Thus, the network of soluble resin molecules may stabilize these particles when water has evaporated from the ink composition. The hydrogen bonds between the soluble resin molecules may be reversible bonds. This means that the intermolecular hydrogen bonds may be broken and subsequently formed again. Moreover, when a component being able to form hydrogen bridges is added to the network of soluble resin molecules, hydrogen bonds may be formed between this component and the soluble resin molecules forming the network. This component may be e.g. water. When water is added to the network formed by the soluble resin molecules, the intermolecular hydrogen bonds between the soluble resin molecules may be (partially) replaced by hydrogen bonds between one of the water soluble resin molecules and water. The network comprising the soluble resin molecules may thereby be partially broken down and the soluble resin may be re-dissolved in the water. Moreover, the particles, such as the pigment particles and the water dispersible resin particles may be re-dispersed in the water. Thus, a stable dispersion may be formed. In summary, the soluble resin comprising the stabilizing group may enable the ink to reversibly dry.

In an inkjet printer, evaporation of water, and optionally other solvents—from the ink composition may result in precipitation of solid components of the ink composition, such as pigment particles or dispersible resin particles. Thus, when solvent evaporates via an orifice of the inkjet printer, for example when the orifice is inactive, solid ink components may precipitate in the vicinity of the nozzle and clog the orifice. The ink composition according to the present invention, comprising a water soluble resin, may enable the solid components to be re-dissolved or re-dispersed, for example by wiping the nozzle area using a wet tissue. Thus, clogging of the orifice may become reversible. This may improve print stability and the life time of a print head.

Furthermore, the addition of the water soluble resin to the ink may reduce paper-curl.

In an embodiment, the water soluble resin is substantially non-crystalline. If the water soluble resin would crystallize, the soluble resin crystal may form a separate phase and less soluble resin would be present in the liquid phase of the ink composition to stabilize the water dispersible resin particles and/or the pigment particles. Crystallization of a compound may depend on a plurality of parameters, one of which is the crystallinity of the compound. Other, non-limiting relevant parameters are e.g. temperature, polarity of the medium and nature an amount of other components present in the medium. If the water soluble resin were a crystalline component, the water soluble resin might crystallize from the ink composition, depending on the conditions. Crystallinity of the water soluble resin may be suitably tuned by suitably designing the structure of the resin. For example, by selecting a backbone that is polydisperse, the crystallinity of the resin may be lowered. For example, the backbone of the water soluble resin may have a polydispersity in the range of 1.0 to 3.0. For example, the water soluble resin may have a polydispersity in the range of 1.1 to 2.5. In addition, the chemical nature of the backbone may influence the crystallinity of the water soluble resin. If the backbone has an irregular shape, the backbone of the water soluble resins present in the ink composition may not stack and therefore, the water soluble resin may not crystallize. If the backbone of the resin is a polymer or oligomer, the (ir)regularity of the shape of the backbone may be suitably tuned by selecting a suitable monomer or a plurality of suitable monomers building the backbone. In case the backbone comprises a plurality of monomer units, the irregularity of the shape of the backbone may result from an irregular order of the different monomer units in the backbone. Alternatively, irregularity of the shape of the backbone may be increased by building stereogenic atoms, preferably stereogenic carbon atoms, into the backbone. A stereogenic carbon atoms carries four substituents. If there are four different substituents, there are two possible conformations, in which the substituents may be arranged in the space around the carbon atom. If the component comprising the stereogenic carbon atom is not optically pure, both conformations are present. The presence of both conformations may provide the backbone with an irregular shape, decreasing the degree of crystallinity of the water soluble resin comprising the backbone. The presence of a plurality of stereogenic carbon atoms may even further increase the irregularity of the shape of the backbone, thereby further decreasing the degree of crystallinity of the water soluble resin comprising the backbone.

Not only the backbone may comprise a stereogenic carbon atom, also the stabilizing group and/or the linking group may comprise a stereogenic carbon atom to decrease the crystallinity of the water soluble resin.

In an embodiment, the water soluble resin has a number averaged molecular weight ($M_n$) in the range of 250 g/mole-5000 g/mole, preferably from 300 g/mole-4000 g/mole, more preferably from 350 g/mole-3000 g/mole. In case the $M_n$ is lower than 250 g/mole, the water soluble resin may be volatile and may evaporate from the ink composition. When the water soluble resin evaporates, the inkjet composition and especially its solid components may not be stabilized anymore by the water soluble resin when the water soluble resin evaporates. In case the $M_n$ is higher than 5000 g/mole, then the miscibility of the water soluble resin in the ink composition may decrease and the viscosity may increase.

In an embodiment, the water soluble resin may be present in the ink composition in an amount of from 1 wt % to 30 wt %, with respect to the total ink composition. Preferably, the water soluble resin may be present in the ink composition in an amount of from 3 wt % to 20 wt %, with respect to the total ink composition. If the amount of the water soluble resin in the ink composition is too low, then water dispersible components, such as the water-dispersible resin and optionally the water-dispersible pigment, may not be suitably stabilized anymore upon evaporation of water or a water/co-solvent mixture. If the amount of the water soluble resin in the ink composition is too high, then the robustness and/or water-fastness of the printed image may be decreased.

In an embodiment, the ink composition comprising the water soluble resin and the water dispersible resin may be curable. For example, the ink composition comprising the water soluble resin and the water dispersible resin may be thermally curable. After the ink has been applied onto a receiving medium, the solvent, e.g. water, may evaporate from the ink composition and the ink composition may dry. When the dried ink composition is later on brought into contact with water, the ink components may re-dissolve or re-disperse and the image may be removed from the receiving medium. When the water soluble curable resin is curable and the ink is cured after being applied onto the receiving medium, the water soluble resin may loose its water solubility and a water resistant image may be obtained. The water resistant image may be suitable for outdoor applications, because of its water resistance. Curing may be carried out e.g. by radiation, such as UV, or by heating. Curing is also known as fusing.

The water soluble resin according to the present invention may satisfy the general formula presented below:

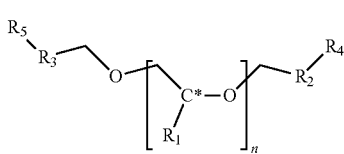

Formula 1 wherein $R_1$ represent H, an alkyl group, such as a methyl, ethyl, a n-propyl, an i-propyl, a n-butyl, an i-butyl, a t-butyl, an n-pentyl, an i-pentyl, or a t-pentyl group; an aryl group, such as a benzyl or a naphthalene group, an alkylaryl group, such as a methylbenzyl, an ethylbenzyl, a propylbenzyl, a dimethylbenzyl, a trimethylbenzyl, an methylethylbenzyl, or a methylpropylbenzyl group, an alkoxyaryl, such as a methoxybenzyl, an ethoxybenzyl, a methoxynaphthalene or an ethoxynaphthalene group, a hydroxy group, an hydroxy alkyl group, or an amine group, such as a primary amine group.

n Is in the range of from 1 to 80, preferably from 1 to 60, more preferably from 2 to 30. The backbone, formed by the —[CH$_2$C*(R$_1$)O]— moieties, may be a linear backbone or a branched backbone.

$R_2$ and $R_3$ may be identical or different and may be selected from an alkyl group, such as a difunctional radical based on an alkyl group, such as a difunctional radical based on methyl, ethyl, i-propyl, n-propyl, n-butyl, i-butyl, t-butyl, linear or branched pentyl, linear or branched hexyl, linear or branched heptyl, a difunctional radical based on an alkoxy group, such as a difunctional radical based on a linear or a branched alkoxy group, for example, methoxy, ethoxy, propoxy, butoxy, a difunctional radical based on an amine, such as a difunctional radical based on a primary amine, a secondary amine or tertiary amine, for example a methylamine, an ethylamine, a propylamine, a butyl amine, a pentyl amine, a hexylamine, a heptylamine, an octylamine, a nonylamine or a decylamine.

$R_4$ and $R_5$ may be identical or different and may be selected from an ester or an amide moiety, for example a glutamate-group, a 5-pyrrolidonecarboxylate group, a 5-pyrrolidonecarboxamido group, a salicylate group, an amino-acid group, a sorbitol group, a monosaccharide group, such as a glucose group, a fructose group, a xylose group, a galactose group, a ribose group and a deoxyribose group, or a disaccharide group, such as a sucrose group, a maltose group and a lactose group.

Table 1 shows a number of non-limiting examples of water soluble resins according to the present invention.

TABLE 1

| No | Structural formula | $M_n$ (gram/mole) |
|---|---|---|
| 2 | | 500-2500 |
| 3 | | 500-2500 |
| 4 | | 500-2500 |

TABLE 1-continued

| No | Structural formula | $M_n$ (gram/mole) |
|---|---|---|
| 5 | 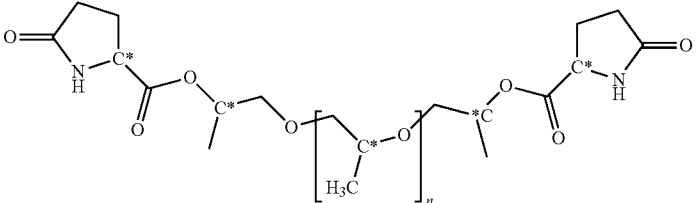<br>n = 3-50 | 500-2500 |

Ink Vehicle

The ink composition may further comprise water. Water may function as the vehicle in the ink composition and may dissolve and/or disperse the components of the ink, such as the colorant, the dispersible resin and the water soluble resin. It may be beneficial to use water as the vehicle in the ink composition for health, safety and environmental reasons. When water evaporates, for example after droplets of the ink have been applied onto the receiving medium, no VOC (volatile organic compounds) may be emitted. Moreover, water vapor may reduce the risk of fire, since water is not flammable, in contrast to many organic solvents.

Optionally, co-solvents may be added to the ink composition. Co-solvents may be added to tune the properties of the ink composition, for example the polarity of the ink, the viscosity of the ink and/or the film formation of the ink on a receiving material may be tuned by adding co-solvents to the ink composition.

Co-solvents may be present in the ink composition in an amount of from 0 wt %-40 wt % with respect to the total ink composition, for example from 2 wt %-32 wt % with respect to the total ink composition. Non-limiting examples of co-solvents are glycol, ethylene glycol, propylene glycol, diethylene glycol, glycerin, 1,2-propanediol, pyrrolidone, 1,5-pentanediol, 1,6-hexanediol and 1,2,6-hexanetriol. The co-solvent, as well as the amount of the co-solvent added to the ink composition may preferably be selected such that the water-soluble resin is soluble in the resulting ink vehicle.

The ink composition may further comprise additional components. For example, the ink composition may comprise a surface tension modifying agent. The surface tension modifying agent may be any compound that has surface active properties and does not react with other components of the latex composition.

Examples of suitable surface tension modifying agents are surfactants like the Triton X series (Triton X-100), which are octylphenolethoxylate surfactants; aerosol OT (dioctyl sodium sulphosuccinate), SDS (sodium dodecyl sulphate) and polysiloxane based surfactants (e.g. Byk 349).

The ink composition may further comprise a buffer to maintain the pH of the ink composition within a predetermined range, a fungicide, a biocide, and an anti-oxidant.

The ink composition according to the present invention, comprising the water soluble resin in accordance with the present invention is suitable for printing an image onto an image receiving medium using an inkjet printing apparatus.

In an aspect of the invention, a method for preparing a water soluble resin according to the present invention is provided, the method comprising the steps of:
a) providing a backbone precursor, the water soluble resin precursor comprising a water soluble backbone, the water soluble backbone consisting essentially of a polyethyleneglycol chain, a polypropyleneglycol chain or a polyethyleneglycol-propyleneglycol chain;
b) providing a stabilizing group precursor, the stabilizing group precursor comprising a stabilizing group, the stabilizing group comprising a 2-pyrrolidone moiety or a salicylic acid moiety;
c) coupling the backbone precursor and the stabilizing group precursor, thereby forming the water soluble resin.

The coupling may take place by reacting the backbone precursor with the stabilizing group precursor, for example in a condensation reaction. The backbone precursor may be, for example a polyether chain, such as a polyethyleneglycol chain, a polypropyleneglycol chain or a polyethyleneglycol-propyleneglycol chain, an oligo amino-acid chain, or a oligo-ether chain, having hydroxyl end groups. The stabilizing group precursor may comprise e.g. a carboxylic acid group. Condensation reaction between the backbone precursor and the stabilizing group precursor may result in the formation of the water soluble resin, comprising e.g. an ester functional group or an amide functional group. However, any suitable coupling reaction may be applied to form the water soluble resin starting from the backbone precursor and the stabilizing group precursor. The reaction may be carried out at any suitable temperature. For example, when the reaction is a condensation reaction, the reaction may be carried out at a temperature from 90° C.-190° C. A suitable solvent may be applied. Optionally, a catalyst may be applied to improve the rate and/or selectivity of the reaction.

In an embodiment, the method may further comprise a linkage group precursor. The linkage group precursor may be used to couple the stabilizing group and the backbone by interconnecting them. The coupling of the backbone precursor, the stabilizing group precursor and the linkage group precursor may be carried out in one reaction, or the linkage group may be coupled to a first one of the backbone precursor and the stabilizing group precursor in a first reaction step and in a second reaction step, the linkage group may be coupled to the second one of the backbone precursor and the stabilizing group precursor, thereby obtaining the water soluble resin.

In an aspect of the invention, a method for preparing an ink composition in accordance with the present is provided, the method comprising the steps of:
providing a water soluble resin
providing water
providing a colorant
providing a dispersion comprising a water dispersible resin mixing the water soluble resin, the water, the colorant and the dispersion of the water dispersible resin.

The water soluble resin, the colorant, the dispersion of the water dispersible resin and water have to be provided. The water soluble resin and the colorant may be provided neat or they may be provided in a solution or dispersion. In case the colorant is a pigment, the pigment is preferably provided as a dispersion, such as an aqueous pigment dispersion. The dispersion comprising the water dispersible resin is preferably an aqueous dispersion.

The components may be provided at once, or the components may be added subsequently. The components may be added in any suitable order. Mixing of the components may be carried out at any suitable temperature, for example room temperature.

The ink composition according to the present invention or the ink composition as obtained by a process according to the present invention may be used in an ink, in particular for use in an ink jet process. The present invention therefore also relates to an inkjet ink comprising a water soluble resin according to any embodiment of the present invention or as obtained with a process according to any embodiment of the present invention.

BRIEF DESCRIPTION OF THE DRAWINGS

The present invention will become more fully understood from the detailed description given herein below and accompanying schematic drawings which are given by way of illustration only and are not limitative of the invention, and wherein.

DETAILED DESCRIPTION OF THE DRAWINGS

Figure 1:
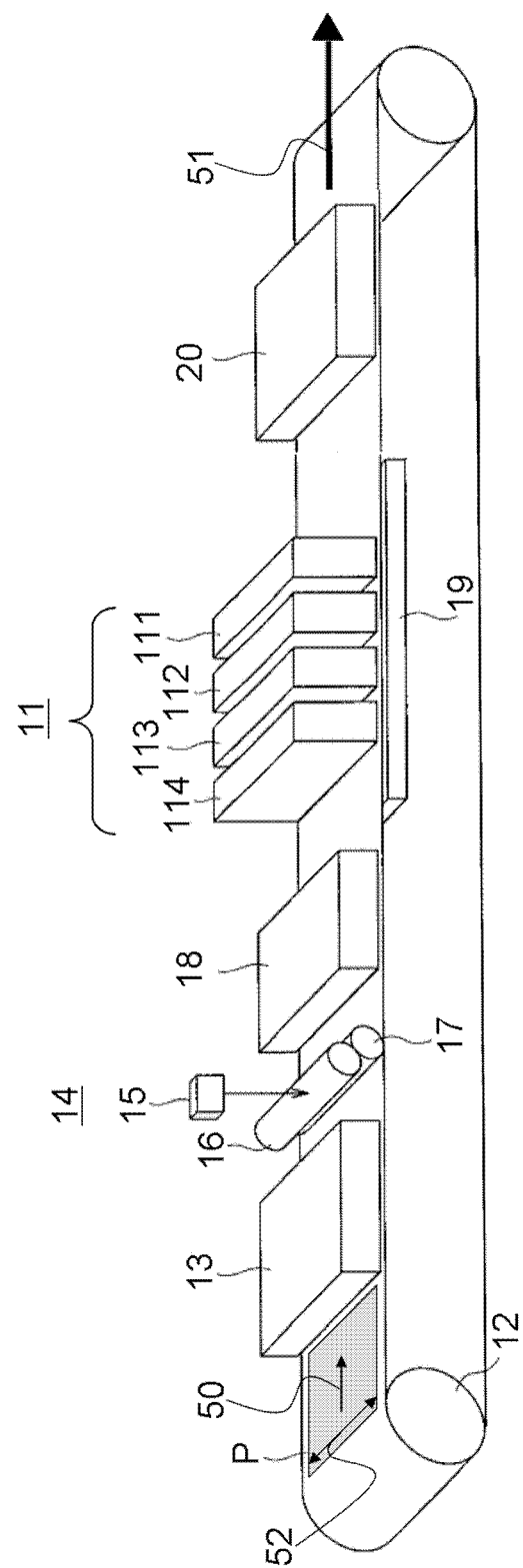
FIG. 1 shows a schematic representation of an inkjet printing system.

In the drawings, same reference numerals refer to same elements.

A printing process in which the inks according to the present invention may be suitably used is described with reference to the appended drawings shown in FIG. 1 and FIG. 2A-C. FIGS. 1 and 2A-C show schematic representations of an inkjet printing system and an inkjet marking device, respectively.

In FIG. 1 a sheet of a receiving medium P is shown. The image receiving medium P may be composed of e.g. paper, cardboard, label stock, coated paper, plastic, machine coated paper or textile. Alternatively, the receiving medium may be a medium in web form (not shown). The medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g. sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g. clamping) and vacuum fixation. Of these, vacuum fixation is preferred.

The printing process as described below comprises of the following steps: media pre-treatment, image formation, drying and fixing and optionally post treatment.

FIG. 1 shows that the sheet of receiving medium P may be conveyed to and passed through a first pre-treatment module 13, which module may comprise a preheater, for example a radiation heater, a corona/plasma treatment unit, a gaseous acid treatment unit or a combination of any of the above. Optionally and subsequently, a predetermined quantity of the pre-treatment liquid is applied on the surface of the receiving medium P at pre-treatment liquid applying member 14. Specifically, the pre-treatment liquid is provided from storage tank 15 of the pre-treatment liquid to the pre-treatment liquid applying member 14 composed of double rolls 16 and 17. Each surface of the double rolls may be covered with a porous resin material such as sponge. After providing the pre-treatment liquid to auxiliary roll 16 first, the pre-treatment liquid is transferred to main roll 17, and a predetermined quantity is applied on the surface of the receiving medium P. Subsequently, the image receiving medium P on which the pre-treatment liquid was supplied may optionally be heated and dried by drying member 18 which is composed of a drying heater installed at the downstream position of the pre-treatment liquid applying member 14 in order to decrease the quantity of the water content in the pre-treatment liquid to a predetermined range. It is preferable to decrease the water content in an amount of 1.0 weight % to 30 weight % based on the total water content in the provided pre-treatment liquid provided on the receiving medium P.

To prevent the transportation mechanism 12 being contaminated with pre-treatment liquid, a cleaning unit (not shown) may be installed and/or the transportation mechanism may be comprised multiple belts or drums as described above. The latter measure prevents contamination of the upstream parts of the transportation mechanism, in particular of the transportation mechanism in the printing region.

Image Formation

Image formation is performed in such a manner that, employing an inkjet printer loaded with inkjet inks, ink droplets are ejected from the inkjet heads based on the digital signals onto a print medium. The inkjet inks may be ink jet inks according to the present invention.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a receiving medium underneath an inkjet marking module.

In FIG. 1, 11 represents an inkjet marking module comprising four inkjet marking devices, indicated with 111, 112, 113 and 114, each arranged to eject an ink of a different color (e.g. Cyan, Magenta, Yellow and black). The nozzle pitch of each head is e.g. about 360 dpi. In the present invention, "dpi" indicates a dot number per 2.54 cm.

Figure 2A:
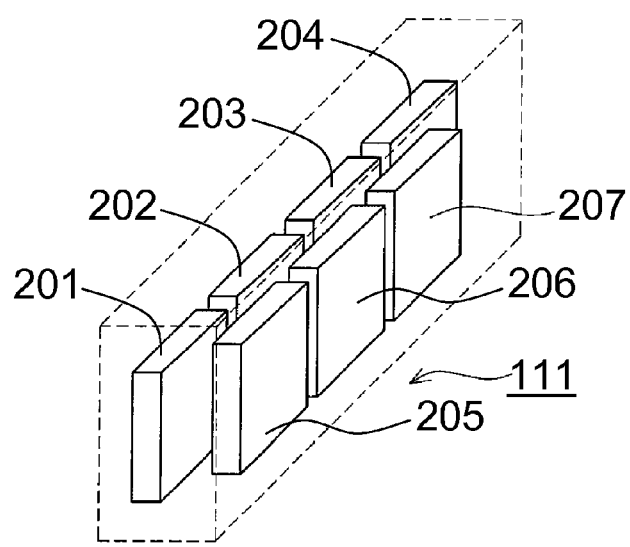
FIG. 2 shows a schematic representation of an inkjet marking device: A) and B) assembly of inkjet heads; C) detailed view of a part of the assembly of inkjet heads.
Figure 2B:
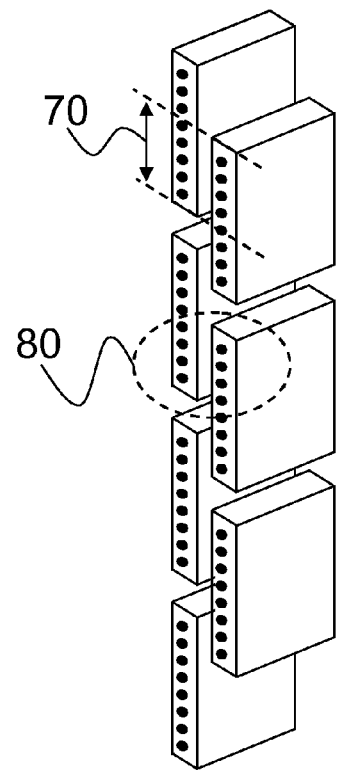
Figure 2C:
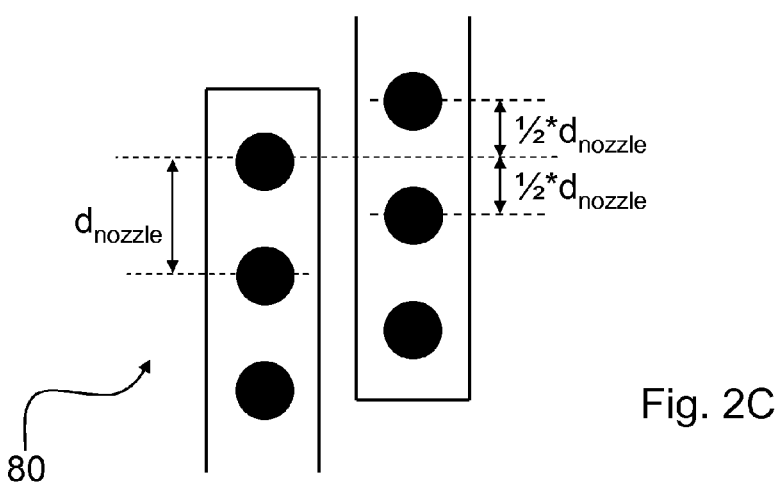

An inkjet marking device for use in single pass inkjet printing, 111, 112, 113, 114, has a length, L, of at least the width of the desired printing range, indicated with double arrow 52, the printing range being perpendicular to the media transport direction, indicated with arrows 50 and 51. The inkjet marking device may comprise a single print head having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of print heads. FIG. 2A shows an inkjet marking device 111 (112, 113, 114 may be identical) comprising 7 individual inkjet heads (201, 202, 203, 204, 205, 206, 207) which are arranged in two parallel rows, a first row comprising four inkjet heads (201-204) and a second row comprising three inkjet heads (205-207) which are arranged in a staggered configuration with respect to the inkjet heads of the first row. The staggered arrangement provides a page wide array of nozzles which are substantially equidistant in the length direction of the inkjet marking device. The staggered configuration may also provide a redundancy of nozzles in the area where the inkjet heads of the first row and the second row overlap, see 70 in FIG. 2B. Staggering may further be used to decrease the nozzle pitch (hence increasing the print resolution) in the length direction of the inkjet marking device, e.g. by arranging the second row of inkjet heads such that the positions of the nozzles of the inkjet heads of the second row are shifted in the length direction of the inkjet marking device by half the nozzle pitch, the nozzle pitch being the distance between adjacent nozzles in an inkjet head, $d_{nozzle}$ (see FIG. 2C, which represents a detailed view of 80 in FIG. 2B). The resolution may be further increased by using more rows of inkjet heads, each of which are arranged such that the positions of the nozzles of each row are shifted in the length direction with respect to the positions of the nozzles of all other rows.

In image formation by ejecting an ink, an inkjet head (i.e. print head) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 µm or less in the current image forming method.

FIG. 1 shows that after pre-treatment, the receiving medium P is conveyed to upstream part of the inkjet marking module 11. Then, image formation is carried out by each color ink ejecting from each inkjet marking device 111, 112, 113 and 114 arranged so that the whole width of the image receiving medium P is covered.

Optionally, the image formation may be carried out while the receiving medium is temperature controlled. For this purpose a temperature control device 19 may be arranged to control the temperature of the surface of the transportation mechanism (e.g. belt or drum) underneath the inkjet marking module 11. The temperature control device 19 may be used to control the surface temperature of the receiving medium P, for example in the range of 10° C. to 100° C. The temperature control device 19 may comprise heaters, such as radiation heaters, and a cooling means, for example a cold blast, in order to control the surface temperature of the receiving medium within said range. Subsequently and while printing, the receiving medium P is conveyed to the down stream part of the inkjet marking module 11.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected receiving medium.

FIG. 1 schematically shows a drying and fixing unit 20, which may comprise a heater, for example a radiation heater. After an image has been formed, the print is conveyed to and passed through the drying and fixing unit 20. The print is heated such that solvents present in the printed image, to a large extent water, evaporate. The speed of evaporation and hence drying may be enhanced by increasing the air refresh rate in the drying and fixing unit 20. Simultaneously, film formation of the ink occurs, because the prints are heated to a temperature above the minimum film formation temperature (MFFT). The residence time of the print in the drying and fixing unit 20 and the temperature at which the drying and fixing unit 20 operates are optimized, such that when the print leaves the drying and fixing unit 20 a dry and robust print has been obtained. As described above, the transportation mechanism 12 in the fixing and drying unit 20 may be separated from the transportation mechanism of the pre-treatment and printing section of the printing apparatus and may comprise a belt or a drum.

Post Treatment

To increase the print robustness or other properties of a print, such as gloss level, the print may be post treated, which is an optional step in the printing process. For example, the prints may be post treated by laminating the prints. Alternatively, the post-treatment step comprises a step of applying (e.g. by jetting) a post-treatment liquid onto the surface of the coating layer, onto which the inkjet ink has been applied, so as to form a transparent protective layer on the printed recording medium.

Hitherto, the printing process was described such that the image formation step was performed in-line with the pre-treatment step (e.g. application of an (aqueous) pre-treatment liquid) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying a pre-treatment liquid, the (optional) step of drying a coating solution, the step of ejecting an inkjet ink to form an image and the step or drying an fixing the printed image are performed. It is, however, preferable to carry out image formation with the above defined in-line image forming method.

Experiments and Examples

Materials

Polypropylene glycol ($M_n \approx 425$ gram/mole) was obtained from Sigma Aldrich. Jeffamine D-230 and Jeffamine EDR-176 were obtained from Huntsman. 2-pyrrolidone-5-carboxylic acid, salicylic acid and xylene were obtained from Sigma Aldrich. As pigment, Pro-Jet™ Black APD 1000 was used. This pigment was obtained from Fujifilm as an aqueous pigment dispersion. As water dispersible resin, Neocryl™ A-1127 was used. Neocryl™ A-1127 is an acrylic resin and is obtained from DSM Neoresins as an aqueous emulsion.

Syringe filters were obtained from VWR. The syringe filters have nylon membrane, the membrane having a pore size of 0.45 µm.

All materials were used as obtained, unless stated otherwise.

Methods
Stability of Ink Composition 5 mL of an ink composition were filled into a 5 mL luer lock syringe provided with a syringe filter. The ink was passed through the filter. When the color of the ink composition does not change upon filtration, and no visible residue of colorant is left on the syringe filter, the ink composition is considered stable. When filtration yield a colorless liquid, and the syringe filter is colored after the filtration, the ink composition is considered instable.

Re-Dispersing Ink Composition

3 Grams of the ink composition was weighted into an aluminum dish having a diameter of 5 cm and was dried at room temperature under atmospheric pressure for 16 hours. After drying, the residue is transferred to a glass flask and an amount of solvent, equal to the amount of solvent evaporated from the ink composition, was added to the residue. The solvent is the solvent used in the ink composition, thus water or a water/co-solvent mixture was used. The mixture was stirred at ambient temperature for one hour. In case no homogeneous mixture was obtained, the ink is considered not re-dispersible. In case a homogeneous mixture was obtained, the ink is considered re-dispersible. The stability of the re-dispersible ink was tested using the stability test for ink jet ink compositions described above.

Stability of Re-Dissolved Ink Composition 5 mL of a re-dispersed ink composition were filled into a 5 mL luer lock syringe provided with a syringe filter having a nylon membrane, the membrane having a pore size of 0.45 µm. The re-dispersed ink was passed through the membrane. When the color of the ink composition does not change upon filtration, and no visible traces of colorant are left on the syringe filter, the re-dispersed ink composition is considered stable. When filtration yield a colorless liquid, and the syringe filter is colored after the filtration, the re-dispersed ink composition is considered instable.

Water-Resistance of Prints Made Using Ink Composition

The ink composition was applied onto a vinyl substrate (8 cm*15 cm) by rodcoating to yield a 8 µm thick layer of the ink composition on the substrate. The substrates, having the ink composition applied thereon are dried; either at low temperature or at high temperature. Drying at low temperature was carried out by letting the substrates dry at room temperature at ambient pressure for 1-4 h. Drying at high temperature was carried out by letting the substrates dry in an oven at 60° C.-80° C. for 5-15 min., at ambient pressure. The water-resistance of the inkjet ink image on the substrate was tested by rinsing the substrate with water. When the inkjet ink image was removed upon rinsing with water, the print was considered not water-resistant. When the inkjet ink image was not removed upon rinsing with water, the print was considered water-resistant.

Experiment 1

Production of Water Soluble Resin (2)

100 gr of 2-pyrrolidone-5-carboxylic acid (0.78 mole) and 94 gr of Jeffamine D-230 (0.82. mole, 1.05 eq) were weighted and put in a 500 mL glass round-bottom flask. 40 mL of xylene was added to the mixture. The round-bottom flask was equipped with Dean-Stark equipment and provided with a nitrogen atmosphere. The mixture was heated to reflux temperature. When a temperature of about 150° C. was reached, a homogeneous mixture was obtained. The mixture was allowed to react at reflux temperature for 24 hours. During the reaction time, the water formed was removed via the Dean Stark equipment. After the mixture has reacted at reflux temperature for 24 hours, the mixture was allowed to cool down and the solvent was removed under reduced pressure and a resin was obtained. The resin was transferred into an aluminium dish and dried for 16 h in an over at a temperature of 150° C. and a pressure of $5*10^{-2}$ mbar. The prepared resin 2 is a transparent glassy material.

Several other resins in accordance with the present invention (3-5) were synthesized in a similar way as describes above, by combining the desired amounts of backbone precursor and a carboxylic acid into the round-bottom flask equipped with a Dean-Stark trap, in experiment 2-4, respectively.

TABLE 2 water soluble resins

| Exp | resin | backbone precursor | carboxylic acid |
|---|---|---|---|
| 1 | 2 | Jeffamine D230 | 2-pyrrolidone-5-carboxylic acid |
| 2 | 3 | Jeffamine D230 | salicylic acid |
| 3 | 4 | Jeffamine EDR-176 | 2-pyrrolidone-5-carboxylic acid |
| 4 | 5 | Polypropylene glycol | 2-pyrrolidone-5-carboxylic acid |

Example 1

Preparation of an Ink Composition (10)

10 grams of water soluble resin 2 was weighted and 60 grams of de-mineralized water was added. The mixture was stirred. Subsequently, the emulsion containing Neocryl™ A-1127 was added. Then, the aqueous dispersion of Pro-Jet™ Black APD 1000 was added. The amounts of emulsion containing Neocryl™ A-1127 and dispersion containing Pro-Jet™ Black APD 1000 that were added were such, that the resulting ink composition 10 comprised 10 wt % of water soluble resin 2, 5 wt % of pigment Pro-Jet™ Black APD 1000 and 10 wt % of Neocryl™ A-1127 water dispersible resin, wherein the weight percentages were based on the weight of the total ink composition 10. If necessary, water was added to obtain an ink composition comprising the desired amounts of the components.

Example 2

Preparation of an Ink Composition (20)

10 grams of water soluble resin 2 was weighted and 20 grams of 2-pyrrolidone was added. The mixture was stirred, and 1 g of Dynol 607 was added to the homogeneous mixture. Subsequently, the emulsion containing Neocryl™ A-1127 was added. Then, the aqueous dispersion of Pro-Jet™ Black APD 1000 was added. The amounts of emulsion containing Neocryl™ A-1127 and dispersion containing Pro-Jet™ Black APD 1000 that were added were such, that the resulting ink composition 20 comprised 10 wt % of water soluble resin 2, 4 wt % of pigment Pro-Jet™ Black APD 1000 and 5 wt % of Neocryl™ A-1127 water dispersible resin, wherein the weight percentages were based on the weight of the total ink composition 20. If necessary, water was added to obtain an ink composition comprising the desired amounts of the components.

Comparative Example 1

30 grams of the Neocryl™ A-1127 emulsion was weighted. To the water dispersible resin emulsion, the aqueous dispersion of Pro-Jet™ Black APD 1000 was added, as well as de-mineralized water. The amounts of dispersion containing Pro-Jet™ Black APD 1000 and water that were added were such, that the resulting ink composition CE1 comprised 5 wt % of pigment Pro-Jet™ Black APD 1000 and 10 wt % of Neocryl™ A-1127 water dispersible resin, wherein the weight percentages were based on the weight of the total ink composition CE1.

Comparison Experiments

Stability of the Ink Composition

In a first comparison experiment, the stability of the ink compositions 10 and 20 is compared to the stability of ink composition CE1. The stability was tested as described above and the results are summarized in table 3.

TABLE 3

|  | 10 | 20 | CE1 |
| --- | --- | --- | --- |
| stability of ink composition | Stable | Stable | Stable |

Both the ink compositions according to the present invention (ink compositions 10 and 20), as well as the ink composition according to the comparative example (CE1) are stable, when they have not yet dried.

Re-Dispersing Ink Composition

The ink compositions were dried at ambient temperature, as described above, and their re-dispersibility was investigated. The result are summarized in table 4.

TABLE 4

|  | 10 | 20 | CE1 |
| --- | --- | --- | --- |
| re-dispersibility | re-dispersible | re-dispersible | not re-dispersible |

The ink according to the present invention (ink compositions 10 and 20) is re-dispersible, whereas the ink according to the comparative example (CE1) is not re-dispersible. Thus, when water has been removed from ink composition 10 or 20, addition of water to the solid residue may result in re-dispersion of the solid residue in water. Therefore, the dispersion of the solid components of ink compositions 10 and 20 is considered reversible. The ability to disperse reversibly is believed to be provided by the water soluble resin comprising the stabilizing group. The ink composition CE1 does not show reversible dispersion of the solid components of the ink composition.

Stability of Re-Dispersed Ink Composition

The stability of the ink compositions after they have been re-dispersed was tested. The results are summarized in table 5. Since the ink composition CE1 showed not to be re-dispersible (or re-dissolvable), the stability of the re-dispersed CE1 ink composition could not be investigated.

TABLE 5

|  | 10 | 20 | CE1 |
| --- | --- | --- | --- |
| stability of re-dispersed ink composition | Stable | Stable | not tested |

The ink compositions 10 and 20, which are ink compositions according to the present invention, were stable after re-dispersion of the ink. Thus, the ink components are of the ink compositions 10 and 20, according to the present invention, are not only reversibly dispersible, the resulting re-dispersed ink composition is also a stable dispersion. Therefore, the ink composition may be suited to be used as an ink after re-dispersion.

Water-Resistance of Prints Made Using Ink Composition

The water-resistance of prints made using ink composition was tested as described above. Prints were made by applying the ink compositions 10 and 20 onto a receiving medium by rodcoating. Two samples were investigated for each ink composition. In one sample, the ink composition (10, 20 resp.) was dried at room temperature after the ink was applied onto the receiving medium. In the second sample, the ink composition (10, 20 resp.) was dried at elevated temperature after the ink was applied onto the receiving medium. The results are summarized in table 6.

TABLE 6

|  | dried at room temperature | dried at high temperature |
| --- | --- | --- |
| water-resistance of print made using ink composition 10 | not-water-resistant | water-resistant |
| water-resistance of print made using ink composition 20 | not-water-resistant | water-resistant |

When the ink was dried at room temperature after the ink composition had been applied onto the receiving medium, the ink applied onto the receiving medium was removed upon rinsing the receiving medium with water, for both ink composition 10 and 20. When the ink was dried at elevated temperature instead, the print made using ink composition was water-resistant, for both ink composition 10 and 20. Thus, when the print is dried at high temperature (fused), the print becomes water-resistant. On the other hand, when the print is not dried at high temperature, the print made using an ink composition according to the present invention is not water-resistant.

When an ink compositions according to the present invention (10, 20) is compared to compositions not in accordance with the present invention (comparative example CE1), it is clear that the ink composition according to the present invention is able to be effectively re-dispersed after drying at room temperature and that the ink composition can become water-resistant upon drying at elevated temperatures. The ink compositions not in accordance with the present invention, on the other hand, cannot be effectively re-dispersed after drying at room temperature.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

The invention claimed is:

1. An ink composition comprising:
   a. water;
   b. a water dispersible resin;
   c. a colorant;
   d. a water soluble resin, the water soluble resin comprising a water soluble backbone and a stabilizing group,
      the water soluble backbone comprising a polyethyleneglycol chain, a polypropyleneglycol chain or a polyethyleneglycol-propyleneglycol chain,
      the stabilizing group comprising a 2-pyrrolidone moiety or a salicylic acid moiety, the stabilizing group being capable of forming intermolecular hydrogen-bonds, wherein the stabilizing group is coupled to the water soluble backbone via a bridging group, the bridging group being selected from the group consisting of an amide bridging group, a urethane bridging group, a carbamate bridging group and an ester bridging group.

2. The ink composition according to claim 1, wherein the water soluble resin is able to form a matrix upon evaporation of water, in which matrix the water dispersible resin and the colorant are stabilized.

3. The ink composition according to claim 1, wherein the water soluble resin is substantially non-crystalline.

4. A method for preparing an ink composition according to claim 1, the method comprising the steps of:
   providing a water soluble resin, the water soluble resin comprising a water soluble backbone and a stabilizing group, the water soluble backbone comprising a polyethyleneglycol chain, a polypropyleneglycol chain or a polyethyleneglycol-propyleneglycol chain, the stabilizing group comprising a 2-pyrrolidone moiety or a salicylic acid moiety, the stabilizing group being capable of forming intermolecular hydrogen-bonds, wherein the stabilizing group is coupled to the water soluble backbone via a bridging group, the bridging group being selected from the group consisting of an amide bridging group, a urethane bridging group, a carbamate bridging group and an ester bridging group;
   providing water;
   providing a colorant;
   providing a dispersion comprising the water dispersible resin; and
   mixing the water soluble resin, the water, the colorant and the dispersion of the water dispersible resin.

5. A method for printing an image onto an image receiving medium, the method comprises the step of:
   i. applying droplets of a fluid onto the image receiving medium, wherein the fluid is an ink composition according to claim 1.

6. A water soluble resin comprising a water soluble backbone and a stabilizing group,
   the water soluble backbone comprising a polyethyleneglycol chain, a polypropyleneglycol chain or a polyethyleneglycol-propyleneglycol chain,
   the stabilizing group comprising a 2-pyrrolidone moiety or a salicylic acid moiety,
   wherein the stabilizing group is coupled to the water soluble backbone via a bridging group, the bridging group being selected from the group consisting of an amide bridging group, a urethane bridging group, a carbamate bridging group and an ester bridging group.

7. A method for preparing a water soluble resin according to claim 6, the method comprising the steps of:
   a. providing a water soluble resin backbone precursor, the water soluble resin backbone precursor comprising a water soluble backbone, the water soluble backbone comprising a polyethyleneglycol chain, a polypropyleneglycol chain or a polyethyleneglycol-propyleneglycol chain;
   b. providing a stabilizing group precursor, the stabilizing group precursor comprising a stabilizing group, the stabilizing group comprising a 2-pyrrolidone moiety or a salicylic acid moiety;
   c. coupling the water soluble resin backbone precursor and the stabilizing group precursor, thereby forming the water soluble resin, wherein the stabilizing group is coupled to the water soluble backbone via a bridging group, the bridging group being selected from the group consisting of an amide bridging group, a urethane bridging group, a carbamate bridging group and an ester bridging group.

* * * * *